United States Patent [19]
Abo et al.

[11] 4,363,092
[45] Dec. 7, 1982

[54] MALFUNCTION PREVENTING SYSTEM FOR A MICROCOMPUTER SYSTEM

[75] Inventors: Toshimi Abo; Akio Hosaka, both of Yokohama, Japan

[73] Assignee: Nissan Motor Company, Limited, Kanagawa, Japan

[21] Appl. No.: 75,183

[22] Filed: Sep. 12, 1979

[30] Foreign Application Priority Data

Oct. 25, 1978 [JP] Japan .................. 53-130512

[51] Int. Cl.³ ............................................ G06F 11/14
[52] U.S. Cl. ...................................................... 364/200
[58] Field of Search ............ 364/431, 200 MS File, 364/900 MS File; 123/478

[56] References Cited

U.S. PATENT DOCUMENTS

| | | | |
|---|---|---|---|
| 4,097,924 | 6/1978 | Figini | 364/900 |
| 4,145,739 | 3/1979 | Dunning et al. | 364/200 |
| 4,162,526 | 7/1979 | Gass et al. | 364/200 |
| 4,204,249 | 5/1980 | Dye et al. | 364/200 |
| 4,231,091 | 10/1980 | Motz | 364/900 |
| 4,236,213 | 11/1980 | Richardson | 364/900 |
| 4,255,789 | 3/1981 | Hartford et al. | 364/431 |

FOREIGN PATENT DOCUMENTS 2845350 4/1979 Fed. Rep. of Germany ...... 123/478

OTHER PUBLICATIONS

"Multifunction Timer", Cianciosi et al., *IBM TDB*, vol. 19, No. 11, Apr. 1977, pp. 4366-4368.

*Primary Examiner*—Harvey E. Springborn
*Attorney, Agent, or Firm*—Lowe, King, Price & Becker

[57] ABSTRACT

A malfunction preventing system for a microcomputer system is disclosed which detects an abnormal condition in the program execution to produce an alarm or reset signal to automatically restart the computer. The malfunction preventing system is applicable to automotive engine control wherein the computer is capable of returning to normal operation upon detecting a malfunction in program operation for fuel parameter calculation, thereby to keep the automotive engine control in order.

12 Claims, 10 Drawing Figures

MALFUNCTION PREVENTING SYSTEM FOR A MICROCOMPUTER SYSTEM

BACKGROUND OF THE INVENTION

The present invention relates to a malfunction preventing system for a microcomputer system, and more particularly to a microcomputer system capable of returning to normal operation upon detecting a malfunction in a program operation, for example, for calculation of fuel parameters for an automotive engine control.

When performing an automatic control with a computer, under normal conditions, the microcomputer sequentially executes a program. Accordingly, if the program execution is prevented by noise for example, normal control cannot be performed.

In analogue control devices, if malfunctions occur due to a low signal to noise ratio, the devices return to normal control when the ratio increases. On the contrary, in a microcomputer controller, once the program execution is destroyed because of a low signal to noise ratio, control does return to the normal condition even if the hardware is operating and connected in a normal manner and the signal to noise ratio increases, for reasons described infra in more detail. Even if steps are taken substantially to eliminate noise, a malfunction in the microcomputer system makes it impossible to perform normal control thereafter. Particularly, in the case of an automotive engine which includes an ignition system having a high voltage generating apparatus, it is likely that malfunctions due to noise will occur. Since automobiles are normally used by persons who are not technical experts it is preferable to take sufficient steps to protect the microcomputer system so that the vehicle is never rendered uncontrollable because of a malfunction.

In a microcomputer, an initialization is carried out prior to the start of operation. In general, the initialization is classified into "first initialization" and "second initialization". The former refers to hardware initialization of the central processor unit (CPU) after power is supplied, but before program execution. The latter refers to software initialization which occurs prior to the operation of a specified program and specifies the use of input-output I/O ports adapted to this specified program, sets initial values, and so forth.

The above first initialization (which is denoted soley by "initialization" hereinafter) is carried out by holding a reset signal to the a level for a predetermined time interval (e.g. 8 μs). The program operation starts from the time that the reset signal goes high.

For instance, referring to FIG. 1, A and B are, respectively, waveforms showing the changing values of power supply voltage and reset signal. At time $T_1$, power is supplied to the microcomputer system. Then, at time $T_2$, the reset signal rises and the program operation starts from this time. The time interval $\tau_1$ from $T_1$ to $T_2$ is the time required for initializing. Even in the course of program operation, if the reset signal is low, the operation is stopped and reinitialization is carried out, so that the program is executed again from the beginning.

Accordingly, in the event that the reset signal instantaneously goes low, the initialization starts. However, since the reset signal goes high before the time $\tau_1$ required for initializing has elapsed, it is impossible to start the normal operation.

As shown in FIG. 2, a program is stored in a read only memory (ROM) 200 so that each step of the program comprises an instruction (op code) and data (operand). The control processing unit (CPU) 100 specifies an address stored in the ROM 200 to an address bus 300. CPU 100 responds to the instruction read from the specified address of ROM 200 via a data bus 400 and executes it.

Accordingly, if only a one bit error occurs in address bus 300 or certain fits of data bus 400 because of noise interference, the program execution becomes erroneous; such errors are, for example, executing data as instructions, or reading data from the wrong address.

SUMMARY OF THE INVENTION

With the above in mind, an object of the present invention is to provide a microcomputer system which prevents malfunctions in program execution.

Another object of the present invention is to provide a microcomputer system which detects an abnormal condition in program execution to produce an alarm or reset signal to automatically restart the computer.

A further object of the present invention is to provide a microcomputer system capable of protecting program execution from disturbance, such as noise interference in the system.

Still a further object of the present invention is to provide a microcomputer system applicable to automotive engine control wherein the computer is capable of returning to normal operation upon detecting a malfunction in program operation for fuel parameter calculation, thereby to keep the automotive engine control in order.

In one embodiment of the present invention, a malfunction preventing system for a microcomputer system comprises a first circuit for deriving an abnormal condition output signal when a first signal which is derived from the computer under normal conditions of the computer is not continuously output for more than a predetermined time. In response to the first signal being derived for an interval less than the predetermined time, a second means operative indicates an abnormal condition.

According to an other embodiment of the present invention, a malfunction preventing system for a microcomputer system derives a reset signal for resetting the microcomputer in response to the first signal being derived for an interval less than the predetermined time, in place of the above second means.

BRIEF DESCRIPTION OF THE DRAWINGS

The features and advantages of a malfunction preventing system for a microcomputer system according to the present invention will become more apparent from the following description taken in conjunction with the accompanying drawings, in which FIG. 1 includes signal waveforms at the time the system is initialized.

DETAILED DESCRIPTION OF THE PREFERRED EMBODIMENT

Figure 3:
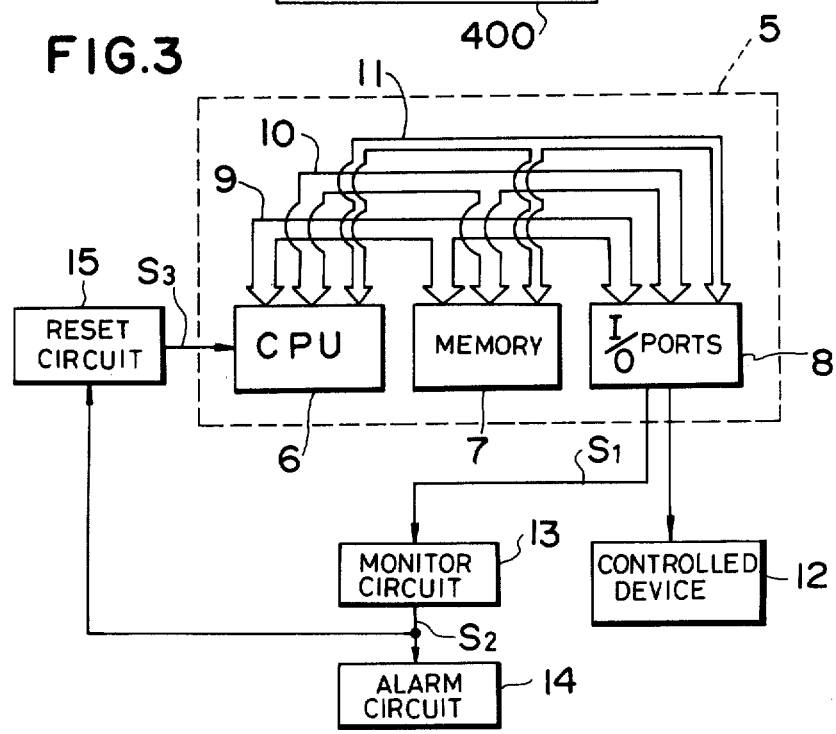
FIG. 3 is a block diagram of an embodiment of the present invention, FIGS. 4A and 4B constitute a flow chart for the operation performed by the embodiment of FIG. 3.

FIG. 3 is a block diagram showing an embodiment of the present invention. In FIG. 3, a microcomputer 5 includes CPU 6, memory 7 (such as a RAM or ROM), I/O ports 8, data bus 9, address bus 10, control bus 11. Microcomputer 5 supplies a signal to controlled apparatus 12 (e.g. automotive engine). Monitor circuit 13 detects a program run signal $S_1$ (described in detail infra) derived from I/O port 8 and determines an abnormal condition when program run signal $S_1$ is not being supplied to an input of the monitor circuit. When the monitor circuit 13 determines the abnormal condition from signal $S_1$, it derives an abnormal output signal $S_2$.

An alarm circuit 14 signals that an abnormal condition has occurred by lighting a lamp or sounding a buzzer when abnormal signal $S_2$ is coupled to an input thereof.

Figure 1:
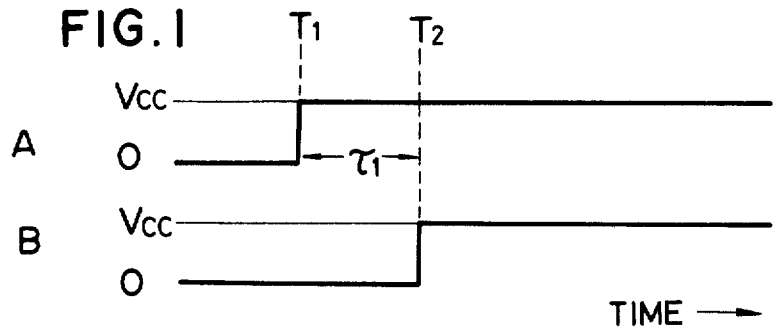
Figure 2:
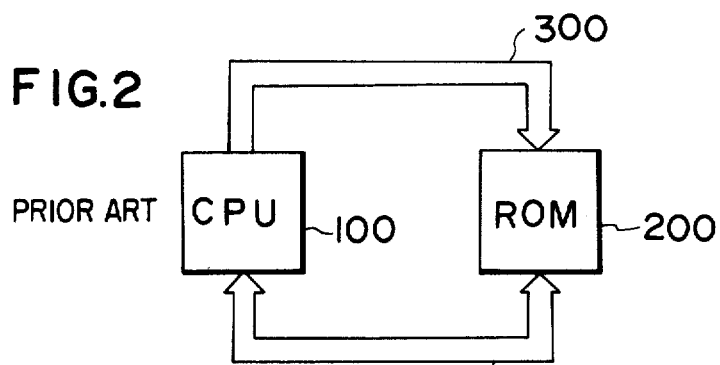
FIG. 2 is a block diagram of a prior art microcomputer.

In response to signal $S_2$, a reset circuit 15 supplies CPU 6 with a reset signal $S_3$ (waveform $B_1$, FIG. 1) which remains low for a predetermined time interval (corresponding to $\tau_1$, of FIG. 1). The positive going edge of signal $S_3$ initializes the microcomputer 5 to restart normal program operation.

Accordingly, in the FIG. 3 circuit, when a normal program operation cannot be carried out, the microcomputer 5 is brought into the reset condition, resulting in an initialization. As a result, in the case of a simple operational error due to noise interference, it is possible for computer 5 to immediately revert to the normal state after the interference has subsided.

In the event that it is impossible to restart normal operation in response to resetting signal $S_2$, because of hardware problems, the alarm circuit 14 becomes operative to signal that an abnormal condition has occurred.

Consideration is now made to the program run signal $S_1$.

The program run signal $S_1$ is a pulse signal which is derived at predetermined time intervals when the microcomputer 5 is running under normal conditions. To enable computer 5 to derive the program run signal $S_1$, the computer includes a program routine, which derives one pulse after one cycle of the program operation has been completed.

For instance, when controlled apparatus 12 is an automotive engine, computer 5 is required to calculate the amount of fuel injection, for electric gas injection (EGI) control, igniting timing, and control of exhaust gas recirculation (EGR) volume.

In such a case, the overall structure of the program is a loop which is executed once for each computation cycle of computer 5; thus at the end of a computation cycle, control returns to the beginning of the program.

Accordingly, as shown in FIG. 4, since a portion of the program inverted in computer 5 derives the program run signal $S_1$ after an EGR calculation by computer 5, program run signal $S_1$ is derived after completion of each cycle of the operation of the computer. Signal $S_1$ is thus periodically derived once each cycle of computer 5 as long as the program operation is executed normally.

The microcomputer 5 has an interrupt function which interrupts the program being executed when a particular circumstance arises. The interrupt function causes computer 5 to execute a specified program beginning at a specified interrupt address. Upon completion of the interrupt function, the program of computer 5 returns to the same point in the program as when the interruption occured so the computer resumes execution of the program being executed at the instant of the interrupt.

Interrupts are classified into several groups, for example NMI (Non Maskable Interrupt) and IRQ (Interrupt Request). As shown in the flowchart of FIG. 4B, when an NMI occurs during EGI calculation, computer 5 interrupts the EGI calculation and transfers to operation for a calculation of increasing the amount of fuel. Upon completion of the fuel increase calculation, the program returns to the EGI calculation. When an IRQ is effected during an ignition timing calculation, the computer 5 interrupts the ignition timing calculation and transfers to operations for the calculation for a fuel cut. Upon completion of the fuel cut calculation, computer 5, returns to the ignition timing calculation at step RTI (Return from Interrupt).

Figure 4A:
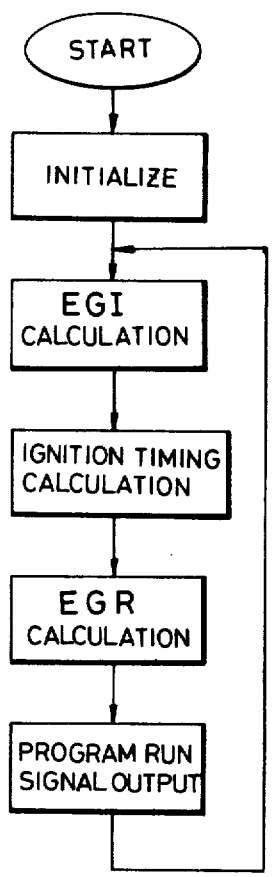
Figure 4B:
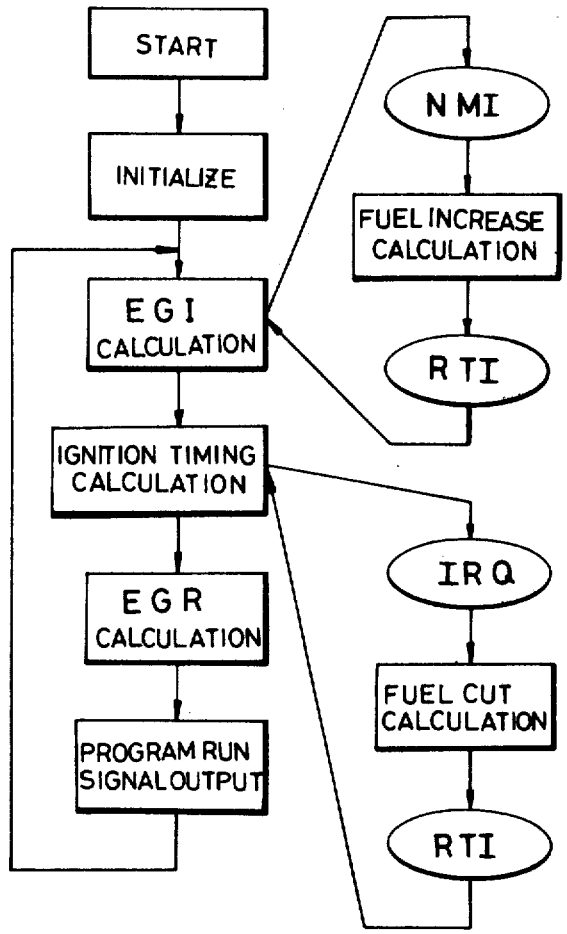

As described above, when interrupts are included in the microcomputer processing, as understood from the flowchart of FIG. 4A, on completion of each cycle of the basic program, a program output signal is derived. This has the disadvantage that the interrupt routine is not executed if the interrupt function is out of order, despite the occurrence of the program output signal.

Accordingly, when interruptions are included in the operation, it is necessary to organize the program so as to set a check point in the interrupt routine (i.e., the calculations for increased amount of fuel or fuel cut as shown in FIG. 4B) to confirm the execution of the interrupt routine before derivation of the program run signal $S_1$. In practical terms, it is sufficient to arrange the program so it stores a flag in a memory (RAM) to indicate that the interrupt routine has been executed and check the flag before executing the routine which derives the program run signal $S_1$.

The execution time varies in accordance with the data being processed at the time the interrupt is to be executed, as well as decision conditions associated with the interrupt to be executed. Accordingly, a constant time interrupt may be used, by which the program is interrupted at fixed time intervals to execute a specified routine. Accordingly, if the routine which outputs the program run signal $S_1$ is inserted in a program executed by a constant time interrupt, the cycle for which the program run signal $S_1$ is output becomes constant, which facilitates signal processing. The program run signal $S_1$ may use the read/write signal of the computer as follows. Since the microcomputer has a bidirectional data bus, it outputs a read/write signal to inform peripheral devices whether the CPU is in the read state or write state. When the microcomputer operates correctly, it outputs alternately "1" or "0" according to the value of the read/write signal. Conversely, if the program operation becomes erroneous, it continuously outputs either "1" or "0". Accordingly, it is possible to use this signal as the program run signal $S_1$.

Reference is now made to a monitor circuit 13, an alarm circuit 14, and a reset circuit 15.

Figure 5:
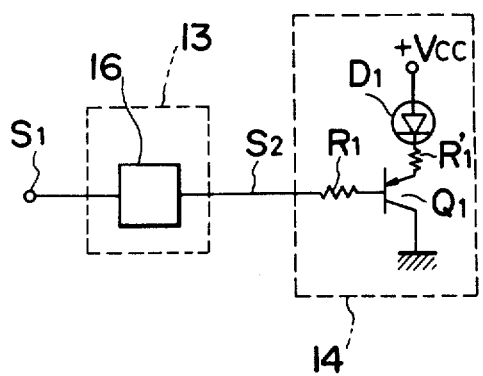
FIG. 5 is a circuit diagram of a monitor circuit and an alarm circuit of the FIG. 3 embodiment, FIG. 6 includes three signal waveforms derived in the circuit illustrated in FIG. 5.
Figure 6:
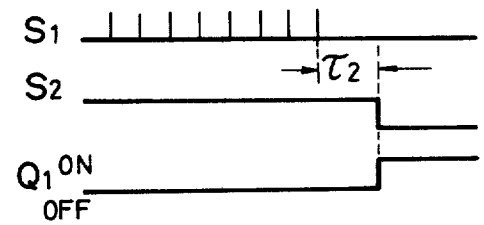

FIG. 5 is a circuit diagram of an embodiment of the monitor circuit 13 and the alarm circuit 14. FIG. 6 is an illustration of three signal waveforms derived in the circuit of FIG. 5.

In FIG. 5, the monitor circuit 13 comprises a retriggerable monostable multivibrator 16 and the alarm circuit 14 comprises a transistor $Q_1$, a light emitting diode $D_1$, and resistances $R_1$ and $R_1'$. Since the retriggerable monostable multivibrator 16 is triggered by the program run signal $S_1$, the abnormal signal $S_2$ is high when the program run signal $S_1$ is continuously supplied with a cycle shorter than the metastable time $\tau_2$. However, if the program run signal $S_1$ fails to interrupt monostable 16 for a time greater than $\tau_2$, the abnormal signal $S_2$ becomes low whereby transistor $Q_1$ goes to drive light emitting diode $D_1$ thereby to indicate that an abnormal conditions has occurred.

The metastable time $\tau_2$ is set so as to be longer than the maximum duration of a cycle of the program run signal being in a state associated with normal program execution.

Figure 7:
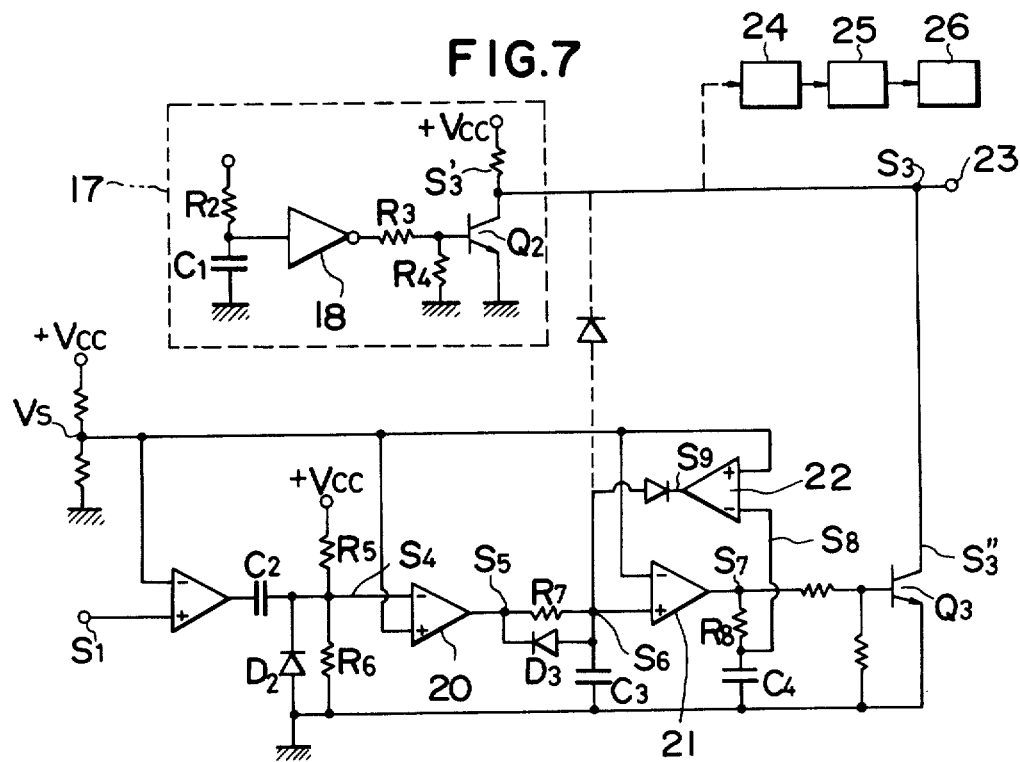
FIG. 7 is a circuit diagram of an embodiment of a monitor circuit and a reset circuit, FIG. 8 includes a series of signal waveforms derived in the circuit of FIG. 7.
Figure 8:
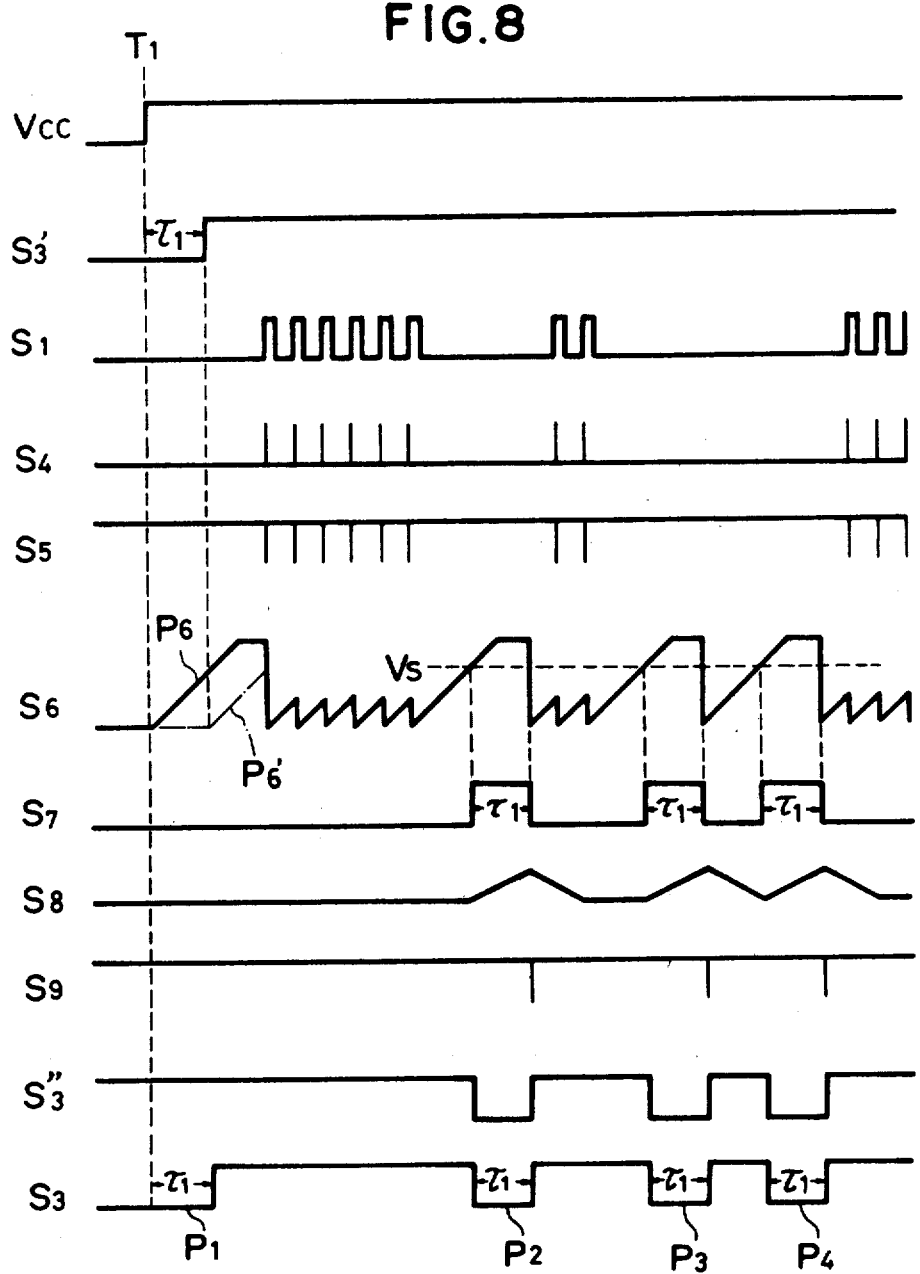

FIG. 7 is a circuit diagram of an embodiment of the monitor circuit 13 and the reset circuit 15. FIG. 8 is an illustration of signal waveforms derived in the circuits of FIG. 7.

In FIG. 7, basic reset circuit 17 derives a reset signal B (FIG. 1) which enables power to be supplied to the remainder of the circuit when power is initially switched on to the circuit. The remaining parts of the circuit of FIG. 7 correspond to the monitor circuit 13 and the reset circuit 15, as shown in FIG. 3.

When the basic reset circuit 17 is energized at the time $T_1$ (corresponding to time $T_1$ in FIG. 8), shunt capacitor $C_1$ is charged at a predetermined rate through a resistor $R_2$ from a DC power supply connected across the resistor and capacitor. When the voltage across the capacitor $C_1$ exceeds a trigger level of an invertor 18, a high level DC voltage is supplied to a voltage dividing circuit which comprises resistors $R_3$ and $R_4$, to render a transistor $Q_2$ forward biased. Accordingly, the voltage $S_3$ at the collector electrode of the transistor $Q_2$ stays low for a predetermined time from the interval when the circuit 17 is energized to the time $\tau_1$ when the transistor $Q_1$ is back biased, an initialization operation is executed during the predetermined interval. After time $\tau_1$, the voltage level of the collector electrode of the transistor $Q_2$ suddenly rises to the high level, and simultaneously the program operation starts.

The program run signal $S_1$ waveform is supplied to comparator 19, having an output coupled to the differentiation circuit which comprises a capacitor $C_2$, a diode $D_2$, and resistors $R_5$ and $R_6$; thereby signal $S_1$ is supplied to the differentiating circuit. The differentiating circuit derives an output signal $S_4$ including narrow width pulses which are derived simultaneously with the leading edges of pulses in signal $S_1$. This pulse signal $S_4$ is inverted by comparator 20, which derives an output signal $S_5$ that is an inverted replica of signal $S_4$.

A charge/discharge circuit comprising a shunt capacitor $C_3$, series diode $D_3$ and series resistor $R_7$ is reset by being discharged in response to each negative pulse in signal $S_5$, simultaneously with the leading edges of the pulses of the signal $S_1$. When pulse signal $S_5$ has a relatively high level, i.e., when the pulses of signal $S_5$ are not being derived, capacitor $C_3$ is charged at a predetermined rate. The voltage across the capacitor $C_3$ is controlled as follows:

A comparator 21 derives output signal $S_7$ which goes high in response to signal $S_6$ being above reference voltage $V_s$. Accordingly, the signal $S_7$ goes high if the program run signal $S_1$ is not supplied to comparator 19 for more than a predetermined time interval.

When the signal $S_7$ goes high, comparator 21 charges capacitor $C_4$ through resistor $R_8$. In response to the potential across the capacitor $C_4$ rising above the predetermined value, output signal $S_9$ of comparator 22 is a short duration negative pulse that is coupled through a diode series connected to the comparator output terminal to discharge and thereby reset capacitor $C_3$. Accordingly, the signal $S_7$ goes high and then returns to low after a predetermined time interval.

The predetermined time interval associated with signal $S_7$ is equal to or more than the time $\tau_2$ required for initialization.

Signal $S_7$ is applied to a resistive voltage divider, having an output tap directly connected to the base electrode of the transistor $Q_3$. Signal $S_7$ causes the potential level of the collector electrode of the transistor $Q_3$ to vary as illustrated by waveform $S_3$, having a low level for an interval $\tau_1$ after time $T_1$ at an initial period $P_1$, as well as additional low levels of duration $\tau_1$ at periods $P_2$, $P_3$, and $P_4$, having leading, negative going transistions and trailing positive going transistions in synchronism with waveform $S_6$ crossing reference voltage $V_s$ in the positive and negative directions, respectively.

In fact, since the collector electrodes of transistor $Q_2$ of the basic reset circuit 17 and the transistor $Q_3$ have a common connection at terminal 23; the reset signal $S_3$ which is derived from the output terminal 23 has a waveform obtained by adding signals $S_3'$ and $S_3''$.

In the waveform $S_3$ of FIG. 8, period $P_1$ defines an initialization time after power is supplied, while periods $P_2$ to $P_4$ define initialization times for resetting when a malfunction occurs during program operation. Particularly, during periods $P_3$ and $P_4$ there are consecutive resets in the case of failure to return to normal operation with the first reset operation.

Thus, repeatedly resetting until the program returns to normal operation makes it possible to guarantee a restart. Even when the microcomputer is operating properly, malfunctions will occur. Therefore, there may be cases when it is necessary to reset repeatedly several times, but this does not necessarily mean a program operation malfunction. However, if the microcomputer actually becomes defective, it is impossible to return to the normal condition even after repeating the reset many times. Accordingly, the microcomputer system may be arranged to count the number of resets and indicate as a malfunction in response to the counted value reaching some predetermined value to render a alarm device operative.

In practice, as seen from FIG. 7, it is sufficient to provide a counter 24 for counting the number of periods in reset signal $S_3$. Comparator 25 responds to counter 24 to derive an alarm output signal when the output of the counter 24 is above the predetermined value. Alarm apparatus 26 is activated in response to the alarm signal derived from comparator 25.

During the time of the first initialization period $P_1$ after power is supplied to the circuit of FIG. 7 a program run signal $S_1$ is not derived. For this reason, the time constant of the network including resistor $R_7$ and capacitor $C_3$, determines the time that signal $S_6$ is above the reference level $V_s$ during the first initialization, as shown by waveform $P_6$ of signal $S_6$ to provide the derivation of the FIG. 8, reset signal. To avoid the derivation of the reset signal in response to waveform $P_6$, as shown by the broken line in FIG. 7, the collector electrode of the transistor $Q_2$ is connected to a terminal of capacitor $C_3$ through a diode as illustrated by the dotted lines. This connection of diode $D_5$ holds capacitor $C_3$ reset as long as the collector electrode of the transistor $Q_2$ is low. The waveform $S_6$ in this case is shown by reference numeral $P_6$. Diode $D_5$ is not required if the duration of period $\tau_1$ is less than the time required for signal $S_6$ to reach reference value $V_5$, in turn determined by the output voltage of comparator 20 and the time constant of the circuit including capacitor $C_3$ and resistor $R_7$.

The malfunction detecting circuit of FIG. 7 detects an abnormal condition when the voltage across a capacitor, which is discharged every time the program signal $S_1$ is derived and is charged at a predetermined time constant, reaches a predetermined value. In a contrary manner to the malfunction detecting circuit can be configured so it detects an abnormal condition when the voltage across a capacitor reaches a predetermined value. This capacitor is charged every time program run signal $S_1$ is derived and is discharged at a predetermined rate determined by the time constant of capacitor $C_3$ and resistor $R_7$.

Figure 9:
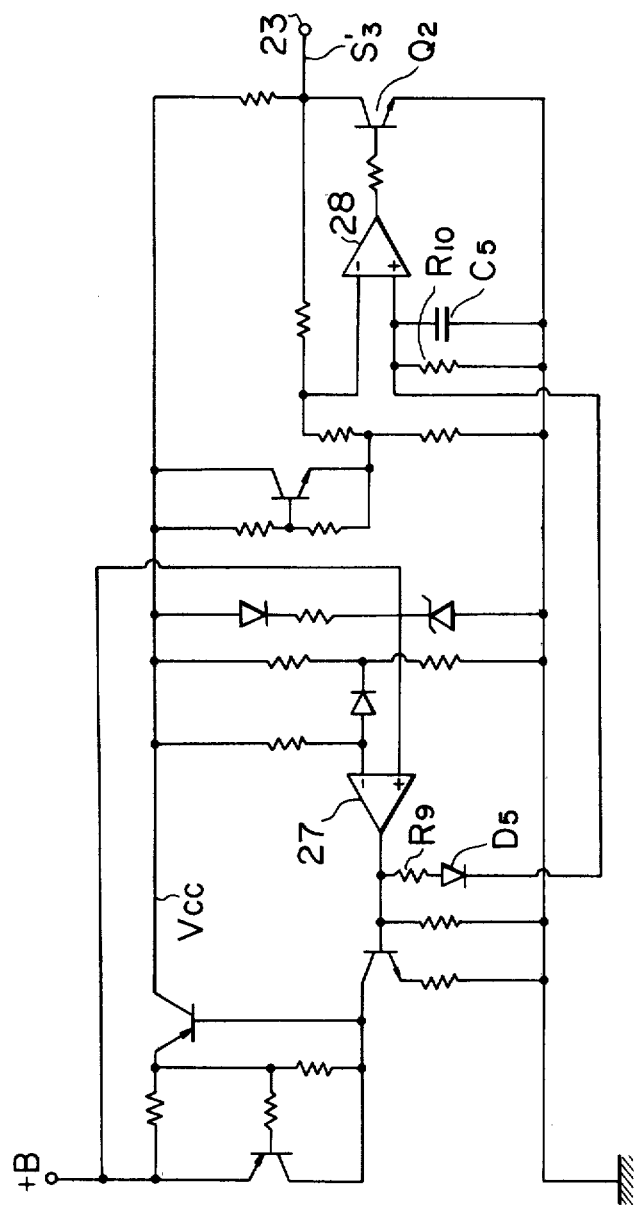
FIG. 9 is a circuit diagram of an embodiment of an elementary reset circuit.

FIG. 9 is a circuit diagram of the basic reset circuit 17 of FIG. 7 in which there is provided a power supply circuit for obtaining a voltage Vcc(+5 V) from a battery voltage +B. Upon supplying power, the output of comparator 27 goes high to charge capacitor $C_5$ through a low impedance resistor $R_9$ and a diode $D_5$.

In response to power being supplied, the output signal of comparator 27 goes to a high level to switch transistor $Q_2$ on, causing reset signal $S_3$ to go to a low level. Afterwards, the output of comparator 27 immediately drops to about ½ Vcc. However, since the voltage across the capacitor $C_5$ is discharged through a high impedance resistor $R_{10}$, reset signal $S_3'$ does not immediately assume a high level but is held to a low level for the time required for resetting. Moreover, in the event that Vcc instantaneously drops because of noise interference on power supply line for the circuit, the output of the comparator 27 has a high level to charge capacitor $C_5$, thereby making it possible to derive the reset signal again.

As will be clear from the foregoing description, the microcomputer malfunction preventing device according to the present invention makes it possible to eliminate or prevent the problem with conventional microcomputer control devices that correct program execution; in particular, problems associated with disturbances such as noise are prevented. Accordingly, the reliability of the microcomputer control device is greatly improved.

It is to be understood that modification and variations of the embodiments of the present invention disclosed herein may be resorted to without departing from the spirit of the invention and the scope of the appended claims.

What is claimed is:

1. Apparatus for preventing certain malfunctions of a microcomputer that is normally periodically cycled through a program, the microcomputer including a reset and initialization input terminal, the apparatus comprising a reset circuit for normally applying a first voltage to the reset and initialization input terminal, the microcomputer responding to the first voltage at the reset and initialization input terminal to continuously recycle the program, means responsive to power being initially applied to the microcomputer and the reset circuit for activating the reset circuit so the reset circuit applies a second voltage to the reset input for a predetermined interval after power is initially applied to the microcomputer and reset circuit, the microcomputer responding to the second voltage to reset the program to a starting point and initialize parameters associated with the program, the predetermined interval being greater than a predetermined time required for the microcomputer to execute a program cycle plus the time required to reset and initialize the microcomputer, the microcomputer deriving a program run impulse in response to the microcomputer executing each program cycle, whereby the microcomputer while normally operating derives adjacent periodic program run impulses at intervals spaced from each other by a predetermined time, the predetermined time being less than the predetermined interval, and means connected to the microcomputer to be responsive to the program run impulses for supplying the second voltage to the reset and initialization input terminal in response to a pair of the impulses not occurring in a predetermined duration, the predetermined duration being greater than the predetermined time, whereby the program is immediately reset and initialized in response to the microcomputer not executing the program within the predetermined duration.

2. In combination,
a microcomputer for normally periodically executing a program, said microcomputer including an output means for generating an output signal in response to the microcomputer executing the program, the output signal having a predetermined periodically occurring characteristic only while the microcomputer normally periodically executes the program;
apparatus for preventing certain malfunctions of the microcomputer,
said apparatus comprising:
first means connected to the output means to respond to said output signal for indicating an abnormal condition of the microcomputer in response to the predetermined periodic characteristic not occurring for a time interval in excess of a predetermined interval greater than the period of the predetermined periodic characteristic;
second means connected to the first means to respond to the abnormal condition being indicated for periodically resetting the program while the abnormal condition is indicated by the first means; and
third means connected to respond to the second means for deriving an alarm signal in response to the program being repeatedly reset by the second means at a frequency exceeding a predetermined occurrence frequency.

3. In combination,
a microcomputer, said microcomputer including an output means for detecting a normal operating condition of the microcomputer, said output means normally producing an output signal with a predetermined periodic characteristic while the microcomputer operates in the normal condition and discontinuing derivation of said output signal in response to the microcomputer failing to operate in the normal condition,
apparatus for preventing certain malfunctions of the microcomputer, said apparatus comprising:

first means connected to said output means for detecting said output signal of said output means and for indicating a failure of the normal microcomputer operation in response to said output signal not being derived by the output means and detected by the first means for a time interval longer than the time between adjacent occurrences of the predetermined periodic characteristic of said output, second means responsive for periodically resetting the microcomputer to an operating point in the normal operating condition in response to the first means indicating the failure, third means for counting occurrence of said second means resetting the microcomputer to derive a counted value signal, means for comparing a value indicated by the counted value signal with a predetermined value for producing an alarm signal in response to the value associated with the counted value being larger than said predetermined value; and a warning system responsive to the alarm signal for deriving an indication of failure of normal operation of the microcomputer.

4. The combination of claim 2 or 3, wherein said first means comprises: a capacitor, means for charging the capacitor with a predetermined time constant between adjacent occurrences of the output signal, means for discharging the capacitor in response to said output signal, and means for sensing the voltage across the capacitor for indicating the microcomputer abnormal condition in response to the voltage across the capacitor exceeding a predetermined level associated with: (a) the time constant, (b) a charging voltage for the capacitor and (c) the time between adjacent occurrences of the output signal.

5. The combination of claim 2 or 3 wherein a portion of the program includes a routine that is cyclically executed in response to the microcomputer normally periodically executing the program, said routine commanding said output means of said microcomputer to derive a pulse signal, said pulse signal being said output signal with the predetermined periodic characteristic.

6. The combination of claim 3, wherein said program includes an interrupt routine, said microcomputer deriving said pulse signal after confirming execution of the interrupt routine.

7. The combination of claim 2 or 3, wherein said microcomputer includes a memory, and means for deriving a read/write signal for controlling the memory, said pulse signal being a read/write signal of the microcomputer.

8. The combination of claim 2 or 3, wherein said first means comprises a retriggerable monostable multivibrator.

9. The combination of claim 2 or 3 wherein said microcomputer includes a reset input and said second means includes means responsive to the indication of abnormality for deriving a reset signal that is coupled to the reset input of the microcomputer system.

10. The combination of claim 9 further including a real time device, the microcomputer including an output port for supplying a control signal to the real time device.

11. In combination, a microcomputer including means for deriving a program run signal in response to each execution of a normally periodically recurring program of the microcomputer;

apparatus for preventing certain malfunctions of the microcomputer, said apparatus comprising:

first means responsive to the program run signal for indicating that the program run signal is not being derived for a predetermined time interval in excess of the period between adjacent occurrences of the program run signal while the program normally recurs, said first means including: a capacitor, means for charging the capacitor with a predetermined time constant between adjacent occurrences of the program run signal, means for discharging the capacitor in response to said program run signal, and means for sensing the voltage across the capacitor for deriving said indication in response to the voltage across the capacitor exceeding a predetermined level associated with: (1) the time constant, (2) a charging voltage for the capacitor, and (3) the time between program run signals while the program normally recurs;

second means responsive to said first means for periodically resetting the microcomputer program to a starting point while the indication is being derived;

third means responsive to the second means for counting the number of times the second means resets the computer; and means responsive to the third means for deriving an alarm signal in response to the counted value being above a predetermined value.

12. The combination of claim 2, 3 or 4, wherein said program includes instructions for controlling fuel supply for an automotive engine based on operating parameters for a controller of the automotive engine.

* * * * *